US010680929B2

(12) United States Patent
Lin et al.

(10) Patent No.: US 10,680,929 B2
(45) Date of Patent: *Jun. 9, 2020

(54) SYSTEMS AND METHODS FOR LIVE TESTING PERFORMANCE CONDITIONS OF A MULTI-TENANT SYSTEM

(71) Applicant: Zuora, Inc., Redwood City, CA (US)

(72) Inventors: Xuquan Lin, San Jose, CA (US); Tinglan Kung, San Jose, CA (US); Sahin Habesoglu, San Francisco, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,469

(22) Filed: May 6, 2019

(65) Prior Publication Data

US 2019/0260659 A1     Aug. 22, 2019

Related U.S. Application Data

(63) Continuation of application No. 16/057,727, filed on Aug. 7, 2018, now Pat. No. 10,284,450, which is a
(Continued)

(51) Int. Cl.
*G06F 15/173* (2006.01)
*H04L 12/26* (2006.01)
(Continued)

(52) U.S. Cl.
CPC ...... *H04L 43/0882* (2013.01); *H04L 41/5038* (2013.01); *H04L 43/50* (2013.01); *H04L 41/5096* (2013.01); *H04L 67/1029* (2013.01)

(58) Field of Classification Search
CPC .. H04L 43/0882; H04L 41/5038; H04L 43/50
(Continued)

(56) References Cited

U.S. PATENT DOCUMENTS 7,111,204 B1   9/2006   Couturier
8,418,000 B1   4/2013   Salame
(Continued)

FOREIGN PATENT DOCUMENTS

WO   2015081307   6/2015

OTHER PUBLICATIONS

European Patent Application No. 16774271.7, Search Report dated Oct. 23, 2018.
(Continued)

*Primary Examiner* — Duyen M Doan
(74) *Attorney, Agent, or Firm* — Sheppard, Mullin, Richter & Hampton LLP (57) ABSTRACT

A method receives start commands for starting end-to-end testing of a live multi-tenant system that hosts shared services for multiple tenants; executes multiple test scripts for generating controller commands in response to the start commands, the executing the test scripts generating respectively synthetic transaction inputs; provides the synthetic transaction inputs to the live multi-tenant system, the live multi-tenant system configured to use the synthetic transaction inputs to perform respectively multiple synthetic transactions involving multiple destinations in the live multi-tenant system, the live multi-tenant system configured to generate respectively multiple test results in response to the multiple synthetic transactions; receives and evaluates the test results generated by the live multi-tenant system to test end-to-end performance conditions of the multi-tenant system; and generates one or more alerts upon recognizing an alert trigger condition based upon the evaluating of the test results.

21 Claims, 7 Drawing Sheets

Related U.S. Application Data continuation of application No. 15/088,050, filed on Mar. 31, 2016, now Pat. No. 10,044,588.

(60) Provisional application No. 62/141,213, filed on Mar. 31, 2015.

(51) Int. Cl.
*H04L 12/24* (2006.01)
*H04L 29/08* (2006.01)

(58) Field of Classification Search
USPC .................................................. 709/223–225
See application file for complete search history.

(56) References Cited

U.S. PATENT DOCUMENTS

| | | | |
|---|---|---|---|
| 9,647,919 B1 | 5/2017 | Arguelles | |
| 2004/0260993 A1* | 12/2004 | Griffin | G06F 11/3414 |
| | | | 714/743 |
| 2005/0289396 A1* | 12/2005 | Hooper | G06F 11/3664 |
| | | | 714/34 |
| 2007/0266148 A1* | 11/2007 | Ruiz | H04L 41/5038 |
| | | | 709/224 |
| 2008/0198742 A1* | 8/2008 | Kaempfer | H04L 43/50 |
| | | | 370/230 |
| 2009/0055522 A1* | 2/2009 | Shen | G06F 11/3433 |
| | | | 709/224 |
| 2012/0042210 A1 | 2/2012 | Glaser | |
| 2014/0172806 A1 | 6/2014 | Wilding | |
| 2015/0149828 A1 | 5/2015 | Mukerji | |
| 2015/0289176 A1 | 10/2015 | Liu | |
| 2015/0370674 A1 | 12/2015 | Lazar | |
| 2016/0147645 A1 | 5/2016 | Kandpal | |

OTHER PUBLICATIONS

International Application No. PCT/US2016/025434, International Search Report and Written Opinion dated Aug. 5, 2016.

Open2Test.org, "QTP Open Source Test Automation Framework Introduction," Version 1.0, Apr. 2009.

Yu, Lian et al., "Testing as a Service over Cloud," 2010 Fifth IEEE International Symposium on Service Oriented System Engineering, pp. 181-188, Jun. 4, 2010.

* cited by examiner

| | SYNC | | |
|---|---|---|---|
| Prod Shard 1 | a moment ago | Prod Shard 10 | a moment ago |
| #3300 | | #3299 | |
| Prod Shard 11 | 9 minutes ago | Prod Shard 12 | a moment ago |
| #3300 | | #3298 | |
| Prod Shard 13 | a moment ago | Prod Shard 15 | 9 minutes ago |
| #3298 | | #3301 | |
| Prod Shard 16 | 6 minutes ago | Prod Shard 17 | a moment ago |
| #3299 | | #2295 | |
| Prod Shard 18 | a moment ago | Prod Shard 19 | 9 minutes ago |
| #3298 | | #3300 | |
| Prod Shard 2 | 7 minutes ago | Prod Shard 20 | a moment ago |
| #3302 | | #3299 | |
| Prod Shard 21 | 5 minutes ago | Prod Shard 22 | 9 minutes ago |
| #3300 | | #3300 | |
| Prod Shard 23 | a moment ago | Prod Shard 24 | a moment ago |
| #3298 | | #3299 | |
| Prod Shard 25 | a moment ago | Prod Shard 26 | 6 minutes ago |
| #3298 | | #3300 | |
| Prod Shard 27 | a moment ago | Prod Shard 28 | a moment ago |
| #3298 | | #3300 | |
| Prod Shard 29 | a moment ago | Prod Shard 3 | a moment ago |
| #3298 | | #3300 | |

FIG. 7

SYSTEMS AND METHODS FOR LIVE TESTING PERFORMANCE CONDITIONS OF A MULTI-TENANT SYSTEM

CROSS-REFERENCE TO RELATED APPLICATIONS

This application is a continuation of U.S. patent application Ser. No. 16/057,727, filed Aug. 7, 2018 and entitled "Systems and Methods for Live Testing Performance Conditions of a Multi-Tenant System," now U.S. Pat. No. 10,284,450, which is a continuation of U.S. patent application Ser. No. 15/088,050, filed Mar. 31, 2016 and entitled "Systems and Methods for Live Testing Performance Conditions of a Multi-Tenant System," now U.S. Pat. No. 10,044,588, which claims the benefit of U.S. Provisional Patent Application Ser. No. 62/141,213, filed Mar. 31, 2015 and entitled "System and Method for Monitoring Multi-Tenant Software-as-a-Service System Using Java Application Test Technology," which are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A service provider may operate a multi-tenant system to provide cloud-based processing, data storage and business-oriented applications to multiple tenants. In many circumstances, the tenants rely on the multi-tenant system to offer services, e.g., subscription billing services, to customers of tenant systems provided by the tenants.

One approach to monitoring performance conditions of the multi-tenant system is to manually check components of the system periodically. However, manual checking components scales poorly and fails to evaluate overall system health.

SUMMARY

In some embodiments, the present invention provides a testing system for testing end-to-end performance conditions of a live multi-tenant system, the testing system comprising a scheduler configured to generate multiple start commands for starting end-to-end testing of a live multi-tenant system that is hosting shared services for multiple tenants; a controller configured to receive multiple controller commands associated with the multiple start commands, to generate respectively multiple synthetic transaction inputs in response to the multiple controller commands, and to provide respectively the multiple synthetic transaction inputs to the live multi-tenant system, the live multi-tenant system configured to use the multiple synthetic transaction inputs to login particular synthetic tenants and perform respectively multiple synthetic transactions involving multiple destinations in the live multi-tenant system, the live multi-tenant system configured to generate respectively multiple test results in response to the multiple synthetic transactions; and an automated test driver configured to receive the multiple start commands from the scheduler, to execute multiple test scripts for generating the multiple controller commands in response to the multiple start commands, to provide the multiple controller commands to the controller, to receive and evaluate the multiple test results generated by the live multi-tenant system to test end-to-end performance conditions of the live multi-tenant system, and to generate one or more alerts upon recognizing an alert trigger condition based upon the evaluating of the multiple test results.

Each destination may be a logical data store. The testing system may further comprise an interface for presenting health indicators of the multi-tenant system in response to the multiple test scripts being executed. The scheduler may generate the multiple start commands periodically. The multi-tenant system may include user interfaces and servers. The multi-tenant system may be further configured to load balance tenant transactions through the user interfaces and servers to the destination. Each synthetic transaction may use a communication path through one of the user interfaces and one of the servers based on the load balancing in the live multi-tenant system to reach a particular destination. Each synthetic transaction may use a particular communication path through a particular one of the user interfaces and a particular one of the servers to reach a particular destination. The evaluating the test results may include comparing the test results against timing information. The evaluating the test results may include comparing the test results against expected test results. The evaluating the test results may include evaluating handoff information between components of the live multi-tenant system. The multiple test scripts may be configured instances of a default test script.

In some embodiments, the present invention may provide a method of testing end-to-end performance conditions of a live multi-tenant system, the method comprising receiving multiple start commands for starting end-to-end testing of a live multi-tenant system that is hosting shared services for multiple tenants; executing multiple test scripts for generating multiple controller commands in response to the multiple start commands, the executing the multiple test scripts generating respectively multiple synthetic transaction inputs; providing respectively the multiple synthetic transaction inputs to the live multi-tenant system, the live multi-tenant system configured to use the multiple synthetic transaction inputs to perform respectively multiple synthetic transactions involving multiple destinations in the live multi-tenant system, the live multi-tenant system configured to generate respectively multiple test results in response to the multiple synthetic transactions; receiving and evaluating the multiple test results generated by the live multi-tenant system to test end-to-end performance conditions of the multi-tenant system; and generating one or more alerts upon recognizing an alert trigger condition based upon the evaluating of the multiple test results.

Each destination may be a logical data store. The method may further comprise presenting health indicators of the multi-tenant system in response to the multiple test scripts being executed. The generating the multiple start commands may include generating the multiple start commands periodically. The multi-tenant system may include user interfaces and servers. The multi-tenant system may be further configured to load balance tenant transactions through the user interfaces and servers to the destinations. Each synthetic transaction may use a communication path through one of the user interfaces and one of the servers based on the load balancing in the live multi-tenant system to reach a particular destination. Each synthetic transaction may use a particular communication path through a particular one of the user interfaces and a particular one of the servers to reach a particular destination. The evaluating the test results may include comparing the test results against timing information. The evaluating the test results may include comparing the test results against expected test results. The evaluating the test results may include evaluating handoff information between components of the live multi-tenant system. The multiple test scripts may be configured instances of a default test script.

In some embodiments, the present invention provides a non-transitory computer-readable storage medium storing program code for causing a processor to perform the steps of receiving multiple start commands for starting end-to-end testing of a live multi-tenant system that is hosting shared services for multiple tenants; executing multiple test scripts for generating multiple controller commands in response to the multiple start commands, the executing the multiple test scripts generating respectively multiple synthetic transaction inputs; providing respectively the multiple synthetic transaction inputs to the live multi-tenant system, the live multi-tenant system configured to use the multiple synthetic transaction inputs to perform respectively multiple synthetic transactions involving multiple destinations in the live multi-tenant system, the live multi-tenant system configured to generate respectively multiple test results in response to the multiple synthetic transactions; receiving and evaluating the multiple test results generated by the live multi-tenant system to test end-to-end performance conditions of the multi-tenant system; and generating one or more alerts upon recognizing an alert trigger condition based upon the evaluating of the multiple test results.

DETAILED DESCRIPTION

Figure 1:
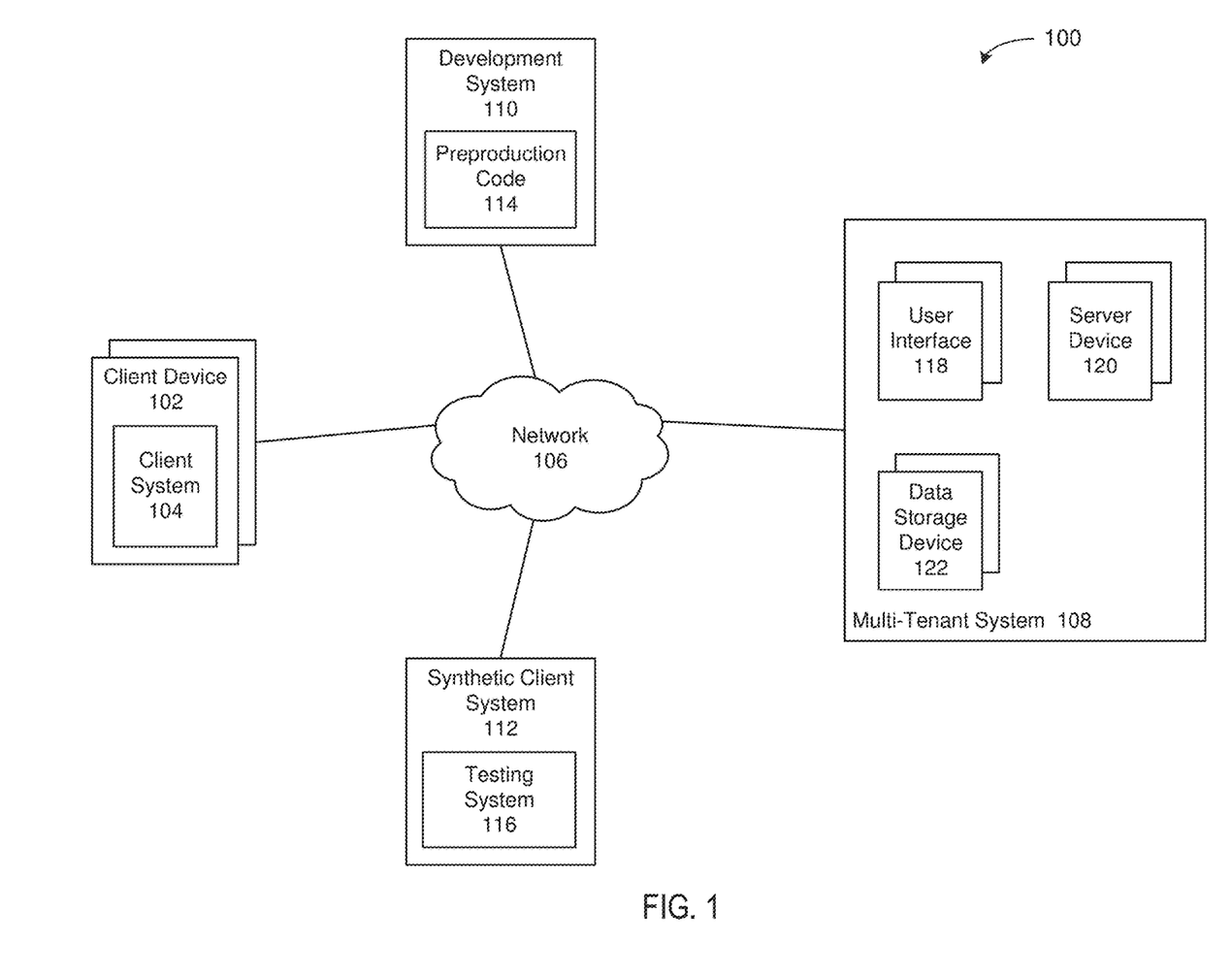
FIG. 1 is a block diagram illustrating a network system for testing performance conditions of a multi-tenant system, in accordance with some embodiments of the invention.

FIG. 1 is a block diagram illustrating a network system 100 for testing the performance conditions of a multi-tenant system 108, in accordance with some embodiments of the present invention. The network system 100 includes client devices 102 coupled via a network (e.g., a set of one or more public and/or private, wired and/or wireless networks) to the multi-tenant system 108. Each of the client devices 102 includes a client system 104 that provides access to the shared services hosted by the multi-tenant system 108. The network system 100 further includes a development system 110 coupled to the network 106 for generating pre-production code 114 that becomes, updates and/or configures the multi-tenant system 108. The multi-tenant system 108 includes live (hot or online) components including a set of user interfaces 118, a set of server devices 120 and a set of data storage devices 122 that cooperate to host the services to the tenants. The network system 100 further includes a synthetic client system 112 that includes a testing system 116 configured to regularly test the performance conditions of the multi-tenant system 108.

Each client device 102 may include a desktop, laptop, notebook, tablet, personal digital assistant, smart phone, or other consumer electronic devices incorporating one or more computer components. The client system 104 on each client device 102 may include hardware, software and/or firmware for communicating with the multi-tenant system 108 and accessing the services hosted thereby. Examples of the client systems 104 may include web browsers, client engines, drivers, user interface components, proprietary interfaces, etc.

The development system 110 may include one or more server devices, application software and/or performance testing systems (e.g., Jenkins) capable of supporting generation of the code for the multi-tenant system 108. The development system 110 may support continuous integration and/or other code generation techniques.

The multi-tenant system 108 includes hardware, software and/or firmware to host the shared services for a plurality of tenants. Each tenant may include a group of one or more users, e.g., individuals, business entities, customers of the business entities, systems, etc., who share access to the hosted services. In one embodiment, the tenant includes the group of users of a service company such as AT&T, Netflix, etc. It will be appreciated that, typically, the typical multi-tenant system 108 offers multi-user access to shared applications on shared devices and offers each the same quality of service. That is, the multi-tenant system 108 does not use virtualization or instantiation processes, and does not vary quality of service among different tenants. In some embodiments, a multi-tenant system 108 integrates several business computing systems into a common system with a view toward streamlining business processes and increasing efficiencies on a business-wide level.

In some embodiments, the multi-tenant system 108 includes a user interface tier of multiple user interfaces 118, a server tier of multiple server devices 120, and a data storage tier of multiple data storage devices 122. In some embodiments, the user interfaces 118 include graphical user interfaces and/or web-based interfaces to enable tenants to access the shared services hosted by the multi-tenant system 108. The user interfaces 118 may support load balancing when multiple tenants (and/or multiple customers of the tenants) try to access the multi-tenant system 108 concurrently. The user interfaces 118 may additionally or alternatively include an operator interface for use by a systems operator to configure or otherwise manage the multi-tenant system 108. In some embodiments, each tenant may be associated with a subset of the total user interfaces 118 for load balancing.

In some embodiments, the server devices 120 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, etc. Similar to the user interfaces 118, in some embodiments, the server devices 120 may support load balancing when multiple tenants (and/or multiple customers of tenants) try to access the multi-tenant system 108 concurrently. Further, in some embodiments, each tenant may be associated with a subset of the total server devices 120 for load balancing.

In some embodiments, tenant data for each tenant may be stored in a logical store within a predetermined set of one or more data storage devices 122. In some embodiments, each tenant uses a logical store that is not assigned to any predetermined data storage devices 122. Each logical store may contain tenant data that is used, generated and/or stored as part of providing tenant-specific business services or functions. Each data storage device 122 may be implemented using any suitable data storage technology, including structured query language (SQL) based relational database management systems (RDBMS).

The testing system 116 may include hardware, software and/or firmware for testing performance conditions of the multi-tenant system 108. Testing of performance conditions may include evaluation of the health of each shared service provided through different combinations of user interfaces 118, server devices 120 and data storage devices 122. Testing of the health of each shared service may ensure that each shared service and/or system component (e.g., user interface 118, server device 120, data storage device 122, processor, memory, etc.) is available through each different path and meets certain performance conditions. In some embodiments, the testing system 116 is configured to select one of a set of credentials for logging into the multi-tenant system 108, to generate synthetic transactions in the multi-tenant system 108 for that selected one of the set of credentials, and to obtain and evaluate test results based on each synthetic transaction and/or combination of synthetic transactions. The testing system 116 may repeat the test for each of the set of credentials, such that each of the set of credentials test a different logical data store of all logical stores in the multi-tenant system 108. Evaluation of the test results may look to evaluate test result accuracy, lag times, resource use, errors noted, communication efficiency between components, etc. The testing system 116 may generate reports, alert response teams to problems, etc. In some embodiments, the testing system 116 may use actual tenant credentials to test actual tenant performance conditions for a synthetic transaction. When using actual tenant credentials, the testing system 116 may perform a clean-up to remove any history of the synthetic transaction.

In some embodiments, the testing system 116 may utilize portions of a pre-production testing system, e.g., the testing scripts defined during pre-production testing, for use in performing the live testing of the performance conditions of the multi-tenant system 108. In some embodiments, a third-party testing system (e.g., Jenkins) can be redirected from the pre-production code 114 in the deployment system 110 towards the production code in the multi-tenant system 108. In some embodiments, a third-party reporting system may be used to compile, process and generate reports from the tests results.

In some embodiments, the testing system 116 may use a keyword-driven automation framework, similar to the Unified Functional Testing (UFT), formerly known as QuickTest Professional (QTP), system provided by Hewlett-Packard®, that allows testers to develop test cases using a spreadsheet and a list of keywords. When a test is executed, the testing system 116 may process the spreadsheet and calls functions associated with keywords in the spreadsheet. The keyword functions perform specific actions against the multi-tenant system 108. The testing system 116 interprets each keyword and executes a set of statements in the multi-tenant system 108. In this manner, testing may be automated using application-specific keywords.

Figure 2:
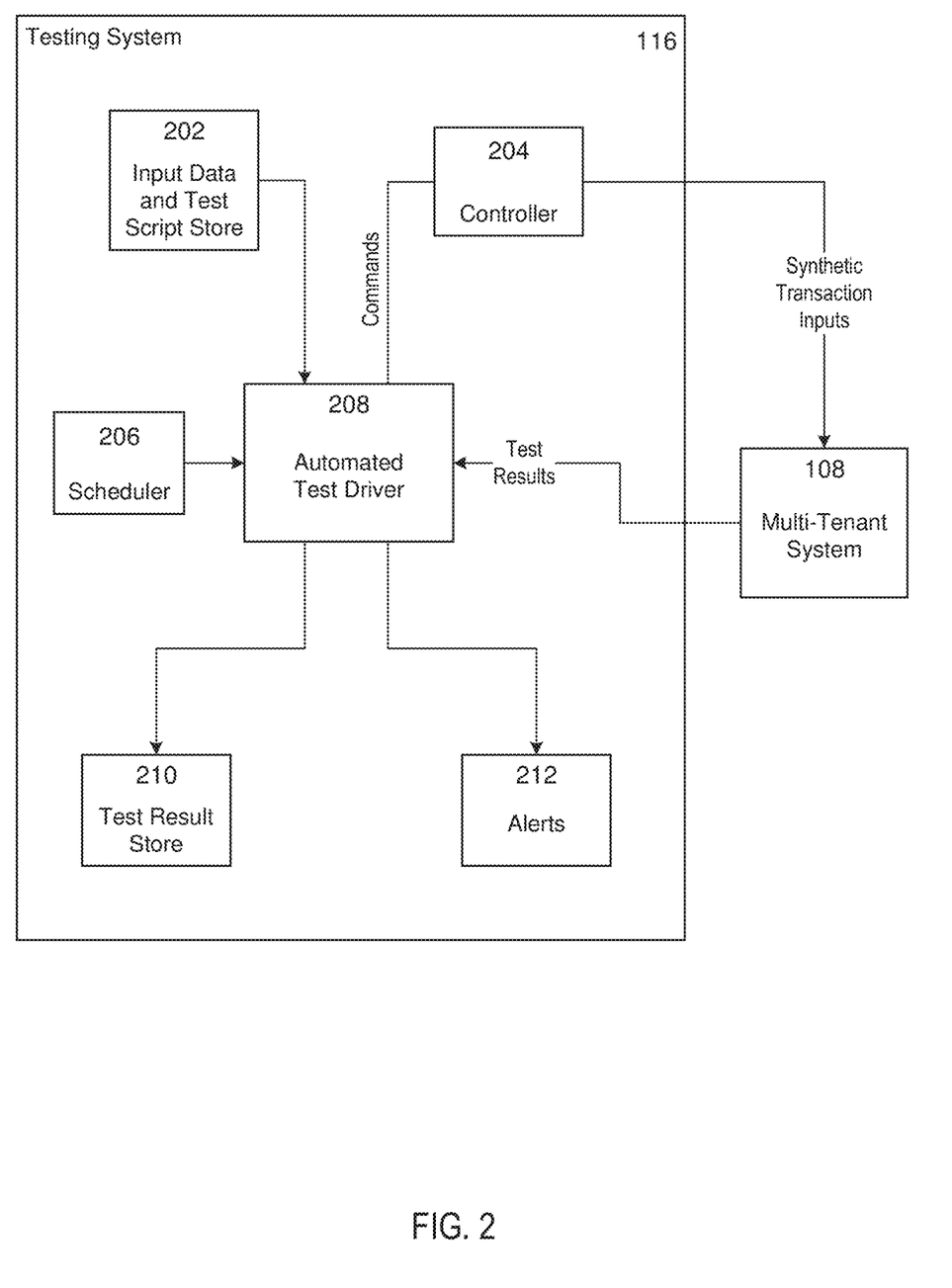
FIG. 2 is a block diagram illustrating details of the testing system of FIG. 1, in accordance with some embodiments of the invention.

FIG. 2 is a block diagram illustrating details of the testing system 116, in accordance with some embodiments of the present invention. The testing system 116 includes an automated test driver 208 that is configured to receive start commands from a scheduler 206, to receive input data and at least one of a set of test scripts from an input data and test script store 202, and to generate and issues test commands to a controller 204 that provides synthetic transaction inputs to the multi-tenant system 108. The automated test driver 208 is further configured to receive test results from the multi-tenant system 108, to evaluate the test results, to generate logs, reports and data that are stored in a test results store 210, and to generate any necessary alerts 212.

The input data and test script store 202 stores input data and sets of one or more test scripts for performing a variety of synthetic transactions in the multi-tenant system 108. The input data may include access credentials, e.g., for a synthetic tenant of a set of synthetic tenants, and transaction data for one or more synthetic transactions. Each synthetic tenant of the set of synthetic tenants may include a unique synthetic user that accesses the hosted services to a different logical store. In some embodiments, the transaction data may be configured to be unique across all synthetic transactions (or unique across all synthetic transactions within a thread of synthetic transactions for each synthetic tenant) so that each synthetic transaction can be independently reviewed and evaluated. In some embodiments, the transaction data may be rendered unique using calendar/clock information. In some embodiments, each test script may be configured to support a synthetic transaction of a particular type and/or may be configured to test a particular logical store of the set of logical stores on the data storage devices 122. The input data and test script store 202 may store test scripts to generate synthetic transactions across all types of transactions available within the hosted services. In other words, a test script can be configured to evaluate the login process, to perform a particular synthetic transaction of a particular type (e.g., add/cancel/modify a billing entry, add/cancel/modify a contact, etc.), to evaluate a particular type of report (e.g., generate a list of all delinquent customer accounts, profit loss summary, etc.), to edit (e.g., add, delete, modify, etc.) particular tenant data, etc. In some embodiments, the test scripts may be configured from a default test script, e.g., by using the test data (such as the credential information) to identify the feature/function/destination/component being tested. In some embodiments, the test scripts and input data may be generated or reconfigured from test scripts and input data generated during pre-production for end-to-end testing of the performance conditions of the pre-production code 114 of the multi-tenant system 108.

The scheduler 206 may be configured to initiate synthetic transactions on a regular basis, for each tenant, for each path through the system, for each hosted service, for each logical data store, and/or the like. In some embodiments, the scheduler 206 initiates a synthetic transaction by generating and transmitting to the automated test driver 208 a start command to initiate performance of each synthetic transaction. The scheduler 506 may be configured to initiate a synthetic transaction periodically (e.g., every minute, every five minutes, once per day, once per week, etc.), at specific times of the day (e.g., at noon and 6 PM PT), upon the occurence of certain conditions (e.g., previously witnessed number of errors, when the processor reaches 80% use, after a tenant complaint, etc.). The scheduler 206 may initiate each synthetic transaction on a timing schedule based on predetermined conditions/preferences (e.g., every thirty minutes during certain times of the day, more often during other times or when errors are noted, etc.).

The scheduler 206 may initiate different threads (chains) of synthetic transactions on a regular basis, each thread being associated with a different path and/or logical data store (e.g., tenant type) though the multi-tenant system 108. A tenant type may be defined based the particular logical data store and/or data storage device(s) 122 in which the tenant data is stored. For example, the scheduler 206 may initiate a first thread of synthetic transactions at a first frequency/timing for a first synthetic tenant whose tenant data is stored in a first logical data store and/or a first data storage device 122, a second thread of synthetic transactions at a second frequency/timing for a second synthetic tenant whose tenant data is stored in a second logical data store and/or second data storage device 122, etc. The synthetic transactions of each thread may be initiated with the same timing and/or different timing as other threads. The synthetic transactions of each thread of synthetic transactions may be initiated with timing dependent on predetermined criteria/preferences (e.g., previously witnessed number of errors, processor use, tenant complaints, etc.). The scheduler 206 may initiate several synthetic transactions across different paths and/or to different logical data stores or different data storage devices 122 in parallel. Additional details regarding initiation of synthetic transactions are provided below with reference to FIG. 3.

The automated test driver 208 includes hardware, software and/or firmware configured to receive the start command from the scheduler 206 for a synthetic transaction, to receive input data and a test script from the input data and test script store 202 for the synthetic transaction, and to generate and issue test commands to the controller 204 for causing the multi-tenant system 108 to perform the synthetic transaction. The automated test driver 208 further includes hardware, software and/or firmware to receive test results from the multi-tenant system 108, to evaluate the test results, to generate and store logs, reports and data in the test results store 210, and to generate any necessary alerts 212. Further details are provided below.

The controller 204 includes hardware, software and/or firmware configured to receive test commands from the automated test driver 208 and to generate and transmit synthetic transaction inputs to the multi-tenant system 108 for causing the multi-tenant system to perform the synthetic transaction. The synthetic transaction inputs include control information, which the multi-tenant system 108 uses to perform the synthetic transaction requested, e.g., login, execution of the synthetic transaction, generation of the report, etc. In some embodiments, the controller 204 includes a browser controller, which controls a web browser that communicates with the web server on the multi-tenant system 108. In some embodiments, the controller 204 includes an application programming interface (API). In some embodiments, the controller 204 includes a client engine controller. In some embodiments, the controller 204 includes a user interface controller. Other alternative controllers are possible. Like other components on the testing system 116 (e.g., the input data and test script store 202, the scheduler 206, the test result store 210, etc.), the controller 204 may be on the multi-tenant system 108, on the synthetic client system 112, or on systems remote from the multi-tenant system 108 and from the testing system 116.

In some embodiments, the automated test driver 208 is configured to evaluate the test results received from the multi-tenant system 108 in response to the synthetic transaction inputs against threshold/expected performance data. Example performance data may include time-based information (e.g., a threshold time period for a login to occur, a threshold time period for the test results to be received), accuracy-based information (e.g., the expected test results in response to the synthetic transaction), component-based information (e.g., threshold capacity for processor utilization, correct handoff information for each component to send to a subsequent component), etc. The automated test driver 208 may be configured to generate an alert, such as an email, text, telephone call or other communication when a trigger condition is met, e.g., when any threshold condition is not met, when a predetermined threshold condition is not met, and/or when several threshold conditions are not met (e.g., two or more sequential threshold conditions are not met, two or more threshold conditions are not met during peak use, etc.). The automated test driver 208 may be configured to transmit the test results and the test reports to the test result store 210 for storage.

An example set of the test results for a single synthetic transaction is provided below:

Established TCP socket on 59925

<===[JENKINS REMOTING CAPACITY]===> channel started

Executing Maven: -B -f /store/jenkins/jobs/Prod Shard 1/workspace/pom.xml test -Dtest=AccountManagerTest, GetSFDCDataTest

[INFO] Scanning for projects . . .

[INFO]

[INFO]—

[INFO] Building SyncMonitor 1.1.1

[INFO]—

[INFO]

[INFO]—maven-resources-plugin:2.6:resources (default-resources)@SyncMonitor—

[INFO] Using 'UTF-8' encoding to copy filtered resources.

[INFO] Copying 6 resources

[INFO]

[INFO]—maven-compiler-plugin:3.3:compile (default-compile)@SyncMonitor—

[INFO] Nothing to compile—all classes are up to date

[INFO]

[INFO]—maven-resources-plugin:2.6:testResources (default-testResources)@SyncMonitor—

[INFO] Using 'UTF-8' encoding to copy filtered resources.

[INFO] skip non existing resourceDirectory /store/jenkins/jobs/Prod Shard 1/workspace/src/test/resources

[INFO]

[INFO]—maven-compiler-plugin:3.3:testCompile (default-testCompile)@SyncMonitor—

[INFO] Nothing to compile—all classes are up to date

[INFO]

[INFO]—maven-surefire-plugin:2.19:test (default-test)@SyncMonitor—

—

TESTS

—

Running com.zuora.monitors.sync.AccountManagerTest 2016.03.23 12:33:10.501 PDT [INFO] c.z.m.s.s.c.Config—Looking for config file: /store/jenkins/jobs/Prod Shard 1/workspace/ZConfig.properties 2016.03.23 12:33:10.509 PDT [INFO] c.z.m.s.s.c.Config—configFilePath=/store/jenkins/jobs/Prod Shard 1/workspace/ZConfig.properties opened successfully 2016.03.23 12:33:10.510 PDT [INFO] c.z.m.s.s.c.Config—Loading configuration file /store/jenkins/jobs/Prod Shard 1/workspace/ZConfig.properties 2016.03.23 12:33:10.528 PDT [INFO] c.z.m.s.ConnectionManager—Connecting to Zuora at uri: https://api.zuora.com/rest/connections as: tommy.lin+testShard1@zuora.com/Test@12345 Tenant ID: 4880 Shard: 1

2016.03.23 12:33:11.510 PDT [INFO] c.z.m.s.ConnectionManager—Successfully connected Zuora 2016.03.23 12:33:11.511 PDT [INFO] c.z.m.s.AccountManager—Update #: 1 to account A00000001 in Zuora at 2016-03-23 12:33:11.511 PDT 2016.03.23 12:33:11.625 PDT [INFO] c.z.m.s.AccountManager—HTTP Status: 200 Success: true 2016.03.23 12:33:11.625 PDT [INFO] c.z.m.s.AccountManager—Current Billing Name: Prod Sync Updated 2016-03-23 12:33:11.511 PDT 2016.03.23 12:33:11.627 PDT [INFO] c.z.m.s.AccountManager—Update #: 2 to account A00000001 in Zuora at 2016-03-23 12:33:11.627 PDT 2016.03.23 12:33:11.716 PDT [INFO] c.z.m.s.AccountManager—HTTP Status: 200 Success: true 2016.03.23 12:33:11.716 PDT [INFO] c.z.m.s.AccountManager—Current Billing Name: Prod Sync Updated 2016-03-23 12:33:11.627 PDT 2016.03.23 12:33:11.716 PDT [INFO] c.z.m.s.AccountManager—Update #: 3 to account A00000001 in Zuora at 2016-03-23 12:33:11.716 PDT 2016.03.23 12:33:11.814 PDT [INFO] c.z.m.s.AccountManager—HTTP Status: 200 Success: true 2016.03.23 12:33:11.814 PDT [INFO] c.z.m.s.AccountManager—Current Billing Name: Prod Sync Updated 2016-03-23 12:33:11.716 PDT 2016.03.23 12:33:11.814 PDT [INFO] c.z.m.s.AccountManager—Update #: 4 to account A00000001 in Zuora at 2016-03-23 12:33:11.814 PDT 2016.03.23 12:33:11.921 PDT [INFO] c.z.m.s.AccountManager—HTTP Status: 200 Success: true 2016.03.23 12:33:11.921 PDT [INFO] c.z.m.s.AccountManager—Current Billing Name: Prod Sync Updated 2016-03-23 12:33:11.814 PDT 2016.03.23 12:33:11.921 PDT [INFO] c.z.m.s.AccountManager—Update #: 5 to account A00000001 in Zuora at 2016-03-23 12:33:11.921 PDT 2016.03.23 12:33:12.025 PDT [INFO] c.z.m.s.AccountManager—HTTP Status: 200 Success: true 2016.03.23 12:33:12.025 PDT [INFO] c.z.m.s.AccountManager—Current Billing Name: Prod Sync Updated 2016-03-23 12:33:11.921 PDT 2016.03.23 12:33:12.025 PDT [INFO] c.z.m.s.AccountManager—Update #: 6 to account A00000001 in Zuora at 2016-03-23 12:33:12.025 PDT 2016.03.23 12:33:12.124 PDT [INFO] c.z.m.s.AccountManager—HTTP Status: 200 Success: true 2016.03.23 12:33:12.124 PDT [INFO] c.z.m.s.AccountManager—Current Billing Name: Prod Sync Updated 2016-03-23 12:33:12.025 PDT 2016.03.23 12:33:12.124 PDT [INFO] c.z.m.s.AccountManager—Update #: 7 to account A00000001 in Zuora at 2016-03-23 12:33:12.124 PDT 2016.03.23 12:33:12.223 PDT [INFO] c.z.m.s.AccountManager—HTTP Status: 200 Success: true 2016.03.23 12:33:12.223 PDT [INFO] c.z.m.s.AccountManager—Current Billing Name: Prod Sync Updated 2016-03-23 12:33:12.124 PDT 2016.03.23 12:33:12.223 PDT [INFO] c.z.m.s.AccountManager—Update #: 8 to account A00000001 in Zuora at 2016-03-23 12:33:12.223 PDT 2016.03.23 12:33:12.324 PDT [INFO] c.z.m.s.AccountManager—HTTP Status: 200 Success: true 2016.03.23 12:33:12.324 PDT [INFO] c.z.m.s.AccountManager—Current Billing Name: Prod Sync Updated 2016-03-23 12:33:12.223 PDT 2016.03.23 12:33:12.324 PDT [INFO] c.z.m.s.AccountManager—Update #: 9 to account A00000001 in Zuora at 2016-03-23 12:33:12.324 PDT 2016.03.23 12:33:12.425 PDT [INFO] c.z.m.s.AccountManager—HTTP Status: 200 Success: true 2016.03.23 12:33:12.425 PDT [INFO] c.z.m.s.AccountManager—Current Billing Name: Prod Sync Updated 2016-03-23 12:33:12.324 PDT 2016.03.23 12:33:12.425 PDT [INFO] c.z.m.s.AccountManager—Update #: 10 to account A00000001 in Zuora at 2016-03-23 12:33:12.425 PDT 2016.03.23 12:33:12.519 PDT [INFO] c.z.m.s.AccountManager—HTTP Status: 200 Success: true 2016.03.23 12:33:12.519 PDT [INFO] c.z.m.s.AccountManager—Current Billing Name: Prod Sync Updated 2016-03-23 12:33:12.425 PDT Tests run: 1, Failures: 0, Errors: 0, Skipped: 0, Time elapsed: 2.408 sec—in com.zuora.monitors.sync.AccountManagerTest Running com.zuora.monitors.sync.GetSFDCDataTest 2016.03.23 12:33:12.522 PDT [INFO] c.z.m.s.GetSFDCData—Checking every 5 seconds for 5 minutes for sync completion 2016.03.23 12:33:12.524 PDT [INFO] c.z.m.s.GetSFDCData—Get Instance URL from SFDC with this URL: https://login.salesforce.com/services/oauth2/token?grant_type=password&client_id=3MVG9fMt
CkV6eLhdgaqNUZKOK2aJtCYDxdpvr8M8m8KG8vtc7A
dZxyQn2fB_Iv9z.jqAKz7AXopoZ1p
7JT.cq&client_secret=7028835987733650542&username=
zforceactivation%2B8%4027demo.co
m&password=Agile%231234

2016.03.23 12:33:13.162 PDT [INFO] c.z.m.s.GetSFDCData—Response: sun.net.www.protocol.http.HttpURLConnection$HttpInput
Stream@1e66f1f5

2016.03.23 12:33:13.162 PDT [INFO] c.z.m.s.GetSFDCData—Response code: 200

2016.03.23 12:33:13.162 PDT [INFO] c.z.m.s.GetSFDCData—Message: OK 2016.03.23 12:33:13.163 PDT [INFO] c.z.m.s.GetSFDCData—Transfer-Encoding=chunked 2016.03.23 12:33:13.163 PDT [INFO] c.z.m.s.GetSFDCData—null=HTTP/1.1 200 OK 2016.03.23 12:33:13.163 PDT [INFO] c.z.m.s.GetSFDCData—Strict-Transport-Security=max-age=10886400; includeSubDomains; preload 2016.03.23 12:33:13.163 PDT [INFO] c.z.m.s.GetSFDCData—Cache-Control=no-cache, no-store 2016.03.23 12:33:13.163 PDT [INFO] c.z.m.s.GetSFDCData—Set-Cookie=BrowserId=-XoUwszqQmaSUxw06GrL3Q;Path=/;
Domain=.salesforce.com;Expires=Sun, 22-May-2016 19:33:12 GMT 2016.03.23 12:33:13.163 PDT [INFO] c.z.m.s.GetSFDCData—Pragma=no-cache 2016.03.23 12:33:13.164 PDT [INFO] c.z.m.s.GetSFD-CData—Expires=Thu, 01 Jan 1970 00:00:00 GMT 2016.03.23 12:33:13.164 PDT [INFO] c.z.m.s.GetSFD-CData—Content-Security-Policy-Report-Only=default-src https:; script-src https: 'unsafe-inline' 'unsafe-eval'; style-src https: 'unsafe-inline'; img-src https: data:; font-src https: data:; report-uri /_/ContentDomainCSPNoAuth?type=login 2016.03.23 12:33:13.164 PDT [INFO] c.z.m.s.GetSFD-CData—Date=Wed, 23 Mar 2016 19:33:12 GMT 2016.03.23 12:33:13.164 PDT [INFO] c.z.m.s.GetSFD-CData—Content-Type=application/j son;charset=UTF-8

2016.03.23 12:33:13.165 PDT [INFO] c.z.m.s.GetSFD-CData—Parsed JSON:

2016.03.23 12:33:13.165 PDT [INFO] c.z.m.s.GetSFD-CData—Access Token: 00Dj0000001tzrb!AQY AQH1ghGLZnhrWfrO.GlptHdr6A1_BFnTuoaFra6pWM4E YqO0a4pCs Da6d1PV4x09fOHftz8JwYSsw9qd14er5Tts1GMkt 2016.03.23 12:33:13.165 PDT [INFO] c.z.m.s.GetSFD-CData—Instance URL: https://na16.salesforce.com 2016.03.23 12:33:13.166 PDT [INFO] c.z.m.s.GetSFD-CData—SFDC Connection URL: https://na16.salesforce.com/services/data/v20.0/query?q=SELECT+name+from+Zuora_Custom erAccount_c 2016.03.23 12:33:13.586 PDT [INFO] c.z.m.s.GetSFD-CData—Response: sun.net.www.protocol.http.HttpURL-Connection$HttpInputStream@1190200a 2016.03.23 12:33:13.586 PDT [INFO] c.z.m.s.GetSFD-CData—Response code: 200

2016.03.23 12:33:13.586 PDT [INFO] c.z.m.s.GetSFD-CData—Message: OK 2016.03.23 12:33:13.589 PDT [INFO] c.z.m.s.GetSFD-CData—Parsed JSON Response:

2016.03.23 12:33:13.589 PDT [INFO] c.z.m.s.GetSFD-CData—Zuora Billing Name: Prod Sync Updated 2016-03-23 12:23:12.600 PDT 2016.03.23 12:33:13.590 PDT [INFO] c.z.m.s.GetSFD-CData—Does Billing name Retrieved from SFDC: Prod Sync Updated 2016-03-23 12:23:12.600 PDT 2016.03.23 12:33:13.590 PDT [INFO] c.z.m.s.GetSFD-CData—equal the name we just updated in Zuora? Prod Sync Updated 2016-03-23 12:33:12.425 PDT 2016.03.23 12:33:18.593 PDT [INFO] c.z.m.s.GetSFD-CData—SFDC Connection URL: https://na16.salesforce.com/services/data/v20.0/query?q=SELECT+name+from+Zuora_Custom erAccount_c 2016.03.23 12:33:18.902 PDT [INFO] c.z.m.s.GetSFD-CData—Response: sun.net.www.protocol.http.HttpURL-Connection$HttpInputStream@d86a6f 2016.03.23 12:33:18.902 PDT [INFO] c.z.m.s.GetSFD-CData—Response code: 200

2016.03.23 12:33:18.903 PDT [INFO] c.z.m.s.GetSFD-CData—Message: OK 2016.03.23 12:33:18.915 PDT [INFO] c.z.m.s.GetSFD-CData—Parsed JSON Response:

2016.03.23 12:33:18.915 PDT [INFO] c.z.m.s.GetSFD-CData—Zuora Billing Name: Prod Sync Updated 2016-03-23 12:33:12.425 PDT 2016.03.23 12:33:18.915 PDT [INFO] c.z.m.s.GetSFD-CData—Does Billing name Retrieved from SFDC: Prod Sync Updated 2016-03-23 12:33:12.425 PDT 2016.03.23 12:33:18.916 PDT [INFO] c.z.m.s.GetSFD-CData—equal the name we just updated in Zuora? Prod Sync Updated 2016-03-23 12:33:12.425 PDT 2016.03.23 12:33:18.916 PDT [INFO] c.z.m.s.GetSFD-CData—Successful Sync in: 6 seconds.

2016.03.23 12:33:18.918 PDT [INFO] c.z.m.s.s.r.GraphiteLogger—Writing to graphite: monitors.sync.Production.1.passed 1 1458761598

2016.03.23 12:33:18.919 PDT [INFO] c.z.m.s.s.r.GraphiteLogger—Writing to graphite: monitors.sync.Production.1.time elapsed 6 1458761598

Tests run: 1, Failures: 0, Errors: 0, Skipped: 0, Time elapsed: 6.375 sec—in com.zuora.monitors.sync.GetSFDCDataTest Results:

Tests run: 2, Failures: 0, Errors: 0, Skipped: 0
[JENKINS] Recording test results
[INFO]—
[INFO] BUILD SUCCESS
[INFO]—
[INFO] Total time: 17.964 s
[INFO] Finished at: 2016-03-23T12:33:23-07:00
[INFO] Final Memory: 15M/373M
[INFO]—

Figure 3:
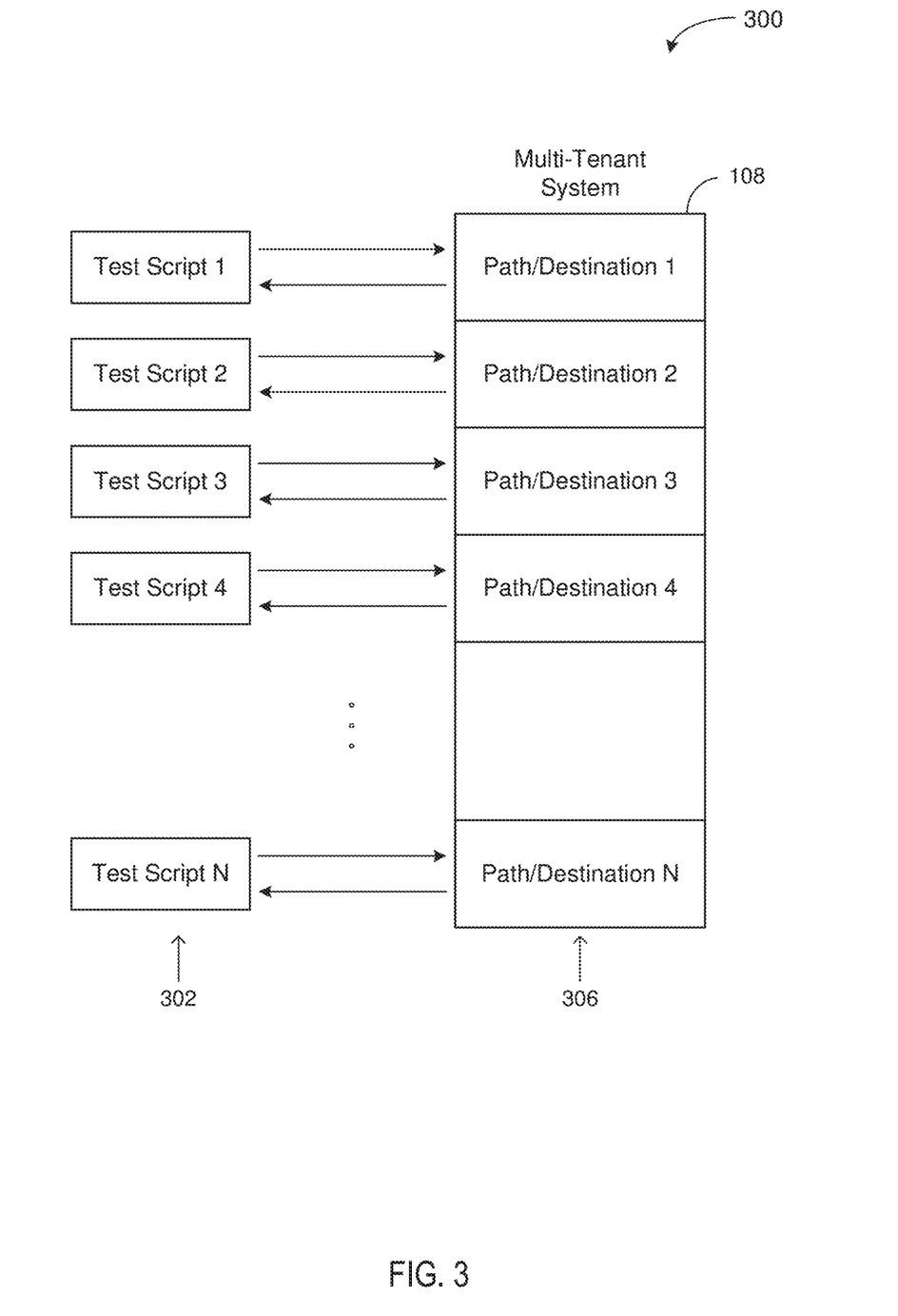
FIG. 3 is a block diagram illustrating details of a multi-path/destination testing system, in accordance with some embodiments of the invention.

FIG. 3 is a block diagram illustrating a multi-path/destination testing system 300, in accordance with some embodiments of the invention. The multi-path/destination testing system 300 includes multiple test scripts 302 being executed in parallel to test performance conditions of the multiple paths/destinations 306 of the multi-tenant system 108. As illustrated, the test script 1 may be executed to test the performance condition of path/destination 1 of the multiple paths/destinations 306 of the multi-tenant system 108. The test script 2 may be executed to test the performance condition of path/destination 2 of the multiple paths/destinations 306 of the multi-tenant system 108. The test script 3 may be executed to test the performance condition of path/destination 3 of the multiple paths/destinations 306 of the multi-tenant system 108. The test script 4 may be executed to test the performance condition of path/destination 4 of the multiple paths/destinations 306 of the multi-tenant system 108. The test script N may be executed to test the performance condition of path/destination N of the multiple paths/destinations 306 of the multi-tenant system 108. The arrow from a test script 302 to the multi-tenant system 108 reflects synthetic transaction inputs. The arrow from the multi-tenant system 108 to a test script 302 reflects test results in response to the synthetic transaction inputs.

In some embodiments, the path/destination 1 may include a generally random communication path through one of the several available user interfaces 118 and through one of the several available server devices 120 to a predetermined logical store in one or more of the data storage devices 122. It will be appreciated that each time test script 1 is executed, the same or an alternative of the multiple available paths to the predetermined logical store may be taken. That is, the path/destination 1 may include a communication path through the same or a different one of the several available user interfaces 118 and through the same or a different one of several available server devices 120 as the previous test instance to the predetermined logical store. The test script 1 can be executed regularly so that, statistically, the test script 1 will test all of the different communication paths of user interface 118 and server devices 120 to the predetermined logical store, and so that during runtime each path is statistically ensured to be evaluated a sufficient number of times in a given time period.

Test scripts 2-N may operate similarly to test script 1. Further, two or more of test scripts 1-N may be executed in parallel to test the respective paths/destinations 1-N of available user interfaces 118 and server devices 120 to the respectively predetermined logical stores. It will be appreciated that execution of each test script 1-N may be initiated at different times, with different timing (e.g., frequency), in response to different triggers, with different timing based on the different triggers, etc. Notably, each test script 1-N may be executed based on a frequency associated with the number of available communication paths to each of the predetermined logical stores.

In some embodiments, each of the test scripts 1-N may be dedicated to a particular communication path including a particular user interface 118, a particular server device 120 and/or a particular logical store, to ensure that each communication path is evaluated (and to remove the element of randomness).

In some embodiments, each test script will include a several tests for several synthetic transactions to sufficiently test end-to-end the services offered by the multi-tenant system 108. In some embodiments, there may be multiple test scripts 1 (e.g., 1a-1n) associated with a communication path/destination 1 through the multi-tenant system 108, such that each test script 1 may test different performance conditions of a different feature, function or component of the communication path (whether applying a dedicated embodiment or a random embodiment described above).

Figure 4:
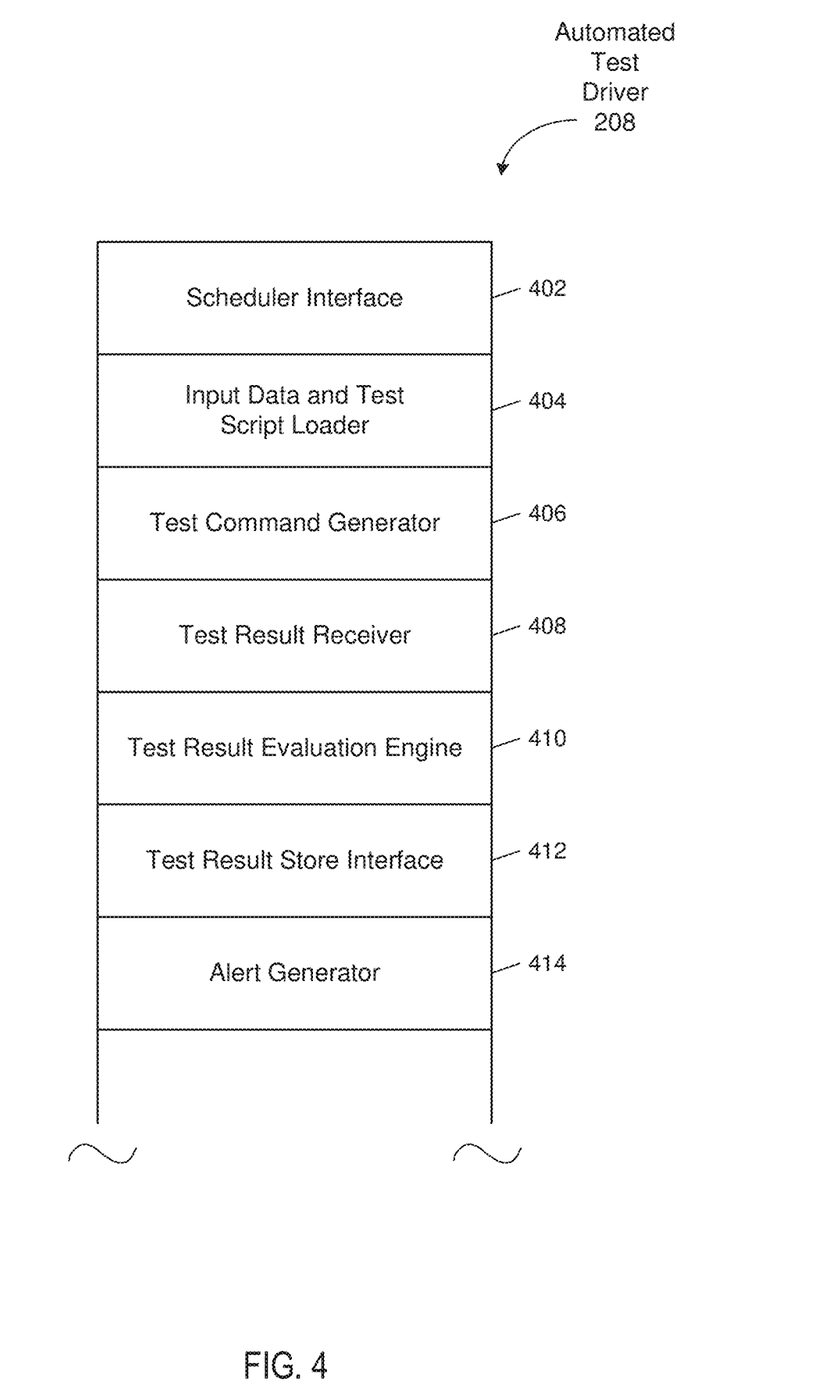
FIG. 4 is a block diagram illustrating details of the automated test driver, in accordance with some embodiments of the invention.

FIG. 4 is a block diagram illustrating details of the automated test driver 208, in accordance with some embodiments of the invention. The automated test driver 208 includes a scheduler interface 402, an input data and test script loader 404, a test command generator 406, a test result receiver 408, a test result evaluation engine 410, a test result store interface 412, and an alert generator 414.

The scheduler interface 402 includes hardware, software and/or firmware configured to communicate with the scheduler 206 to initiate a synthetic transaction. The scheduler interface 402 may receive identification of input data, a test script, a path/destination 1-N, and/or a synthetic transaction. In other embodiments, the test command generator 406 may make the selections of input data, test script, path/destination 1-N and/or synthetic transaction.

The input data and test script loader 404 includes hardware, software and/or firmware configured to communicate with the input data and test script store 202 to obtain input data and a test script and to load the input data and test script for execution.

The test command generator 406 includes hardware, software and/or firmware configured to use the input data and test script to generate and communicate test commands to the controller 204, so that the controller can generate the synthetic transaction inputs to the multi-tenant system 108. The test command generator 406 may generate test commands to instruct the controller 204 to generate several different synthetic transactions through a path/destination 1-N in the multi-tenant system 108.

The test result receiver 408 includes hardware, software and/or firmware configured to receive test results from the multi-tenant system 108 in response to the synthetic transaction inputs. In some embodiments, the test result receiver 408 may communicate directly with the multi-tenant system 108. In some embodiments, the test result receiver 408 may communicate indirectly, e.g., through the controller 204 or through a different controller.

The test result evaluation engine 410 includes hardware, software and/or firmware configured to evaluate the test results. Evaluation of the test results may include comparison against threshold/expected performance data. Evaluation of the test results may include comparing actual time measurements against threshold time values (e.g., did login occur within a threshold time period, were the test results received within a threshold time period). Evaluation of the test results may include comparing actual test result values against expected test result values (e.g., were the test results accurate). Evaluation of the test results may include comparing actual component metrics against threshold component metrics (e.g., was the processor utilization below threshold capacity, was memory utilization below threshold capacity). Evaluation of the test results may include comparing the information each component passes to information each component is expected to pass.

The test result store interface 412 includes hardware, software and/or firmware configured to communicate with the test results store 210 to store the test results, logs, test reports, etc.

The alert generator 414 includes hardware, software and/or firmware configured to evaluate alert trigger conditions to determine whether to generate an alert, e.g., an email, text, telephone call or other communication. The alert generator 414 may determine when an alert trigger condition is met. For example, an alert condition may occur when any threshold condition is not met. An alert condition may occur when a predetermined threshold condition is not met. An alert trigger condition may occur when several threshold conditions are not met, e.g., two or more sequential threshold conditions are not met, two or more threshold conditions are not met during peak use, etc. An alert trigger condition may occur when a particular path appears corrupted. An alert trigger condition may occur when a particular component appears to have failed or to not be operating at a threshold performance level. Other alert trigger conditions are possible.

Figure 5:
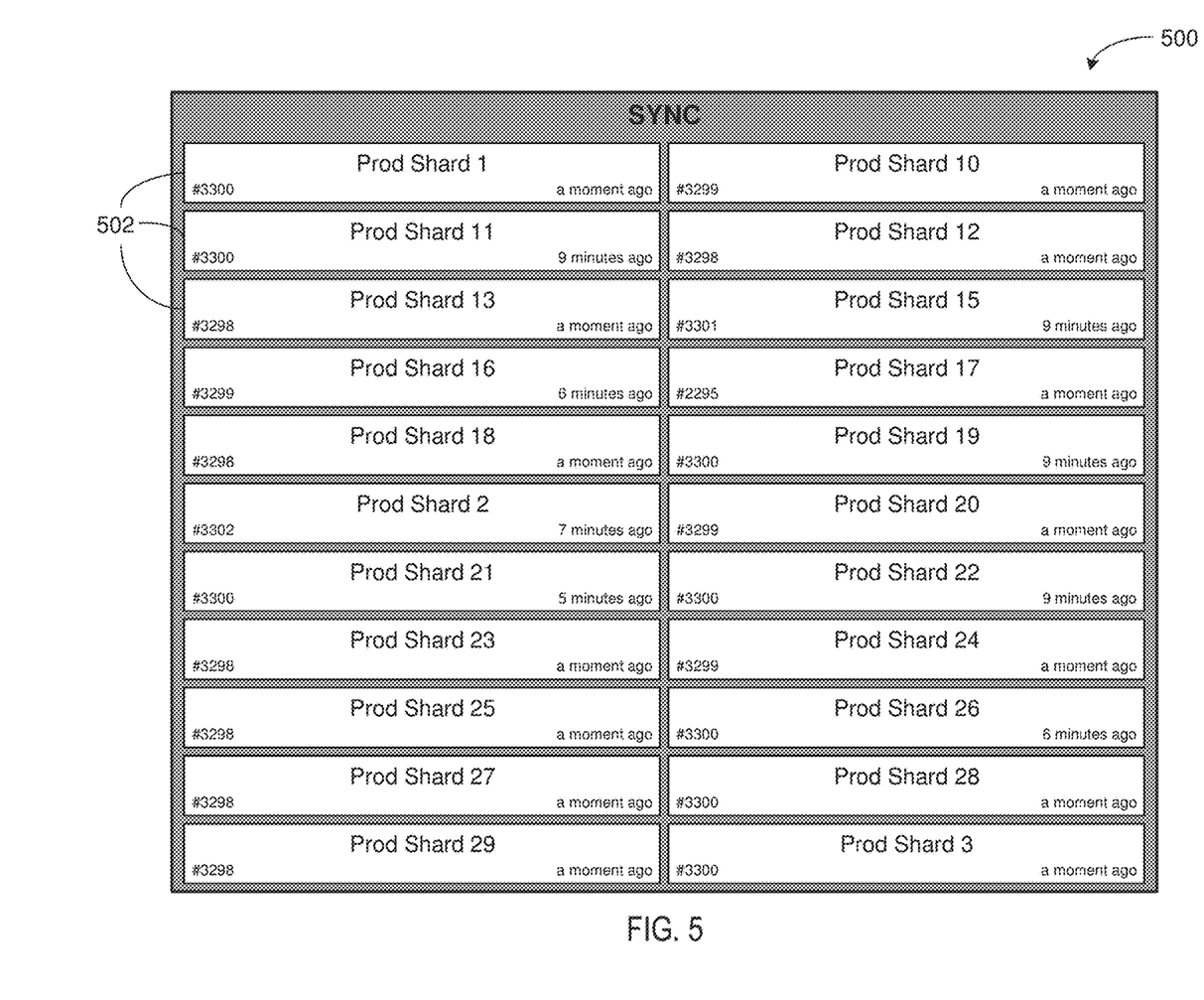
FIG. 5 illustrates an example test result status interface, in accordance with some embodiments of the invention.

FIG. 5 illustrates an example test result status interface 500, in accordance with some embodiments of the invention. As illustrated, the example test result status interface 500 includes test result indicators 502 for a plurality of paths (referred to as a production shard or "Prod Shard") through the multi-tenant system 108. Each production shard is associated with a path identifier (1, 10, 11, 12 . . . 29, 3). Each test result indicator 502 indicates the amount of time that transpired since the last test event (e.g., a moment ago, 9 minutes ago, etc.). Each test result indicator 502 may be presented as a particular color based on the performance condition (status) reflected by the last test. For example, the test result flag 502 may be green to reflect the path as healthy, light green to reflect the path as in the process of being tested and thus far passing, yellow to reflect the path as having failed the last test and at risk (but not yet amounting to an alert trigger condition), light yellow to reflect the path as in the process of being tested and failing, red to reflect an alert trigger condition, light red to reflect the path as transitioning from healthy or at risk status to an alert trigger condition. Other color and/or visual aids may be used to reflect the different performance conditions of the different paths.

Figure 6:
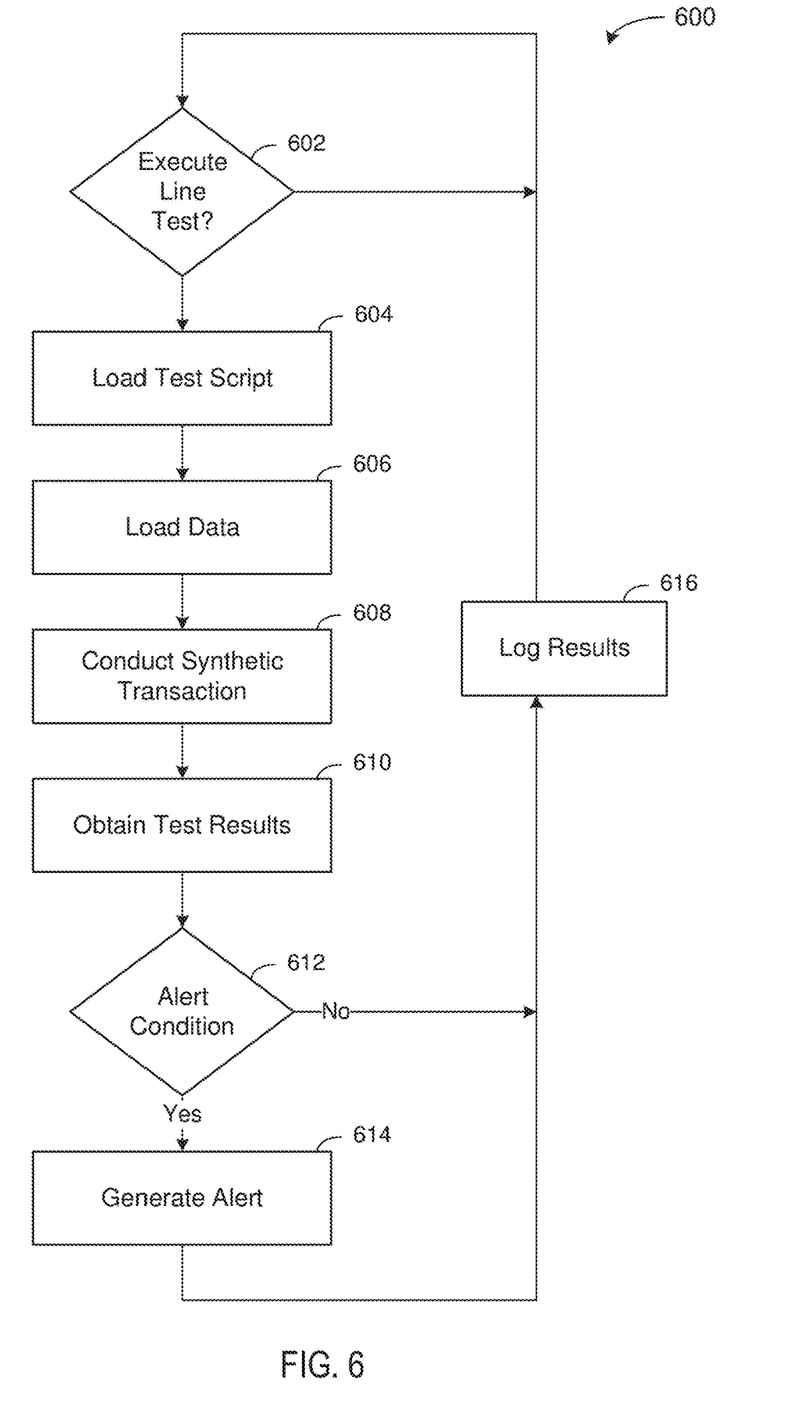
FIG. 6 is a flowchart illustrating a method of testing performance conditions of a multi-tenant system, in accordance with some embodiments of the invention.

FIG. 6 is a flowchart illustrating a method 600 of testing a multi-tenant system, such as the multi-tenant system 108, in accordance with some embodiments of the invention. Method 600 begins with the scheduler 206 in step 602 determining whether to initiate a synthetic transaction in the multi-tenant system 108. In some embodiments, the scheduler 206 in step 602 determines whether to initiate a synthetic transaction of a particular path/destination of the multi-tenant system 108. The input data and test script loader of the automated test driver 208 in step 604 loads the test script and in step 606 loads the input data for the particular synthetic transaction. In step 608, the test command generator 406 of the automated test driver 208 generates and provides test commands to the controller 204, the controller 204 generates and provides synthetic transaction inputs to the multi-tenant system 108, and the multi-tenant system 108 performs the synthetic transaction based on the synthetic transaction inputs. In step 610, the test result receiver 408 receives the test results from the multi-tenant system 108, directly or indirectly.

In step 612, the test result evaluation engine 410 evaluates the test results to determine whether an alert condition has been triggered. If not, then in step 616 the test result store interface 412 stores the test results and/or evaluation reports into the test result store 210. If an alert condition has been triggered, then in step 614 the alert generator 414 generates an alert, and method 600 proceeds to step 616 to log the results and/or evaluation reports. After logging the test results and/or evaluation reports in the test results store 210, method 600 then returns to step 602 to determine whether to initiate another test. In some embodiments, multiple parallel methods 600 operate to test multiple paths/destinations of the multi-tenant system 108.

Figure 7:
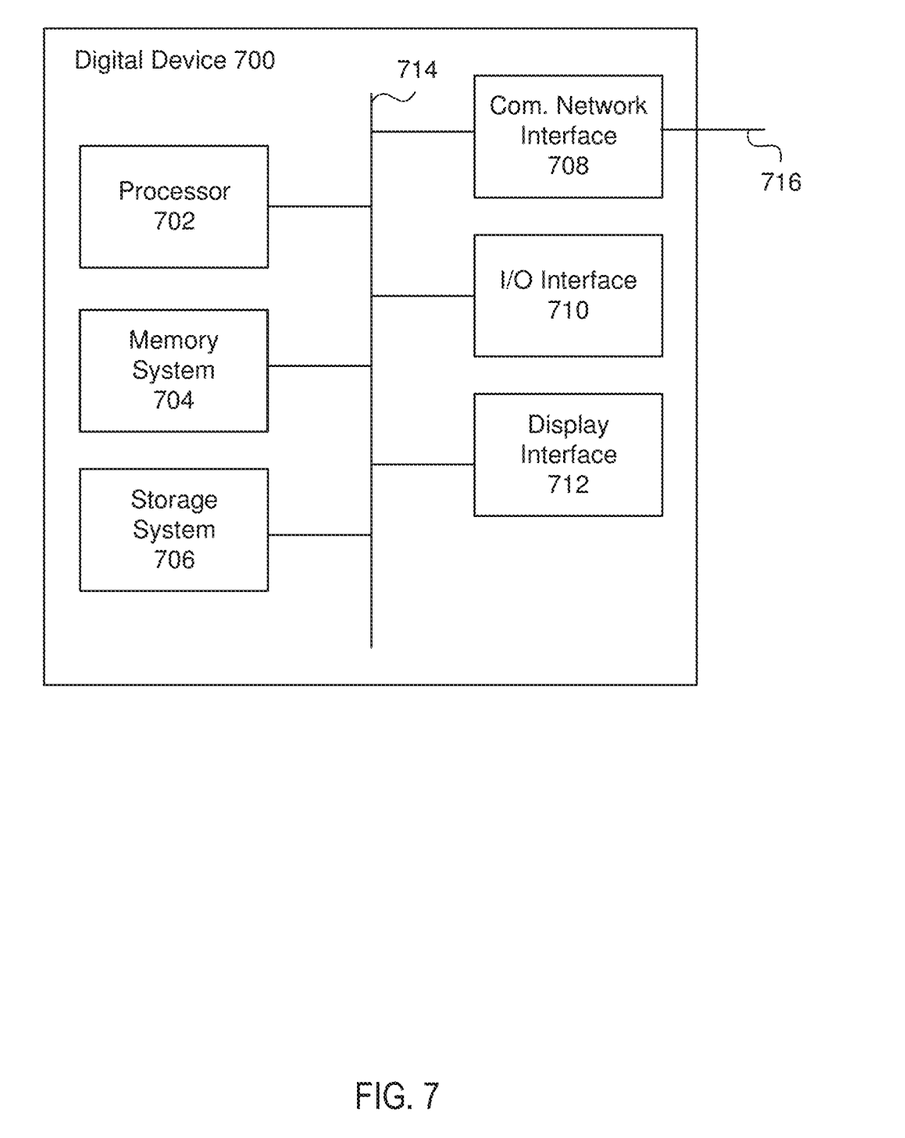
FIG. 7 is a block diagram illustrating a computer system, in accordance with some embodiments of the invention.

FIG. 7 is a block diagram of an exemplary digital device 700. Any of the client 102, development system 110, synthetic client 112 and/or multi-tenant system 108 may include and/or be implemented on one or more digital devices 700. The digital device 700 comprises a processor 702, a memory system 704, a storage system 706, a communication network interface 708, an I/O interface 710, and a display interface 712 communicatively coupled to a bus 714. The processor 702 is configured to execute executable instructions (e.g., programs). In some embodiments, the processor 702 comprises circuitry or any processor capable of processing the executable instructions.

The memory system 704 is any memory configured to store data. Some examples of the memory system 704 are storage devices, such as RAM or ROM. The memory system 704 can comprise the RAM cache. In various embodiments, data is stored within the memory system 704. The data within the memory system 704 may be cleared or ultimately transferred to the storage system 706.

The storage system 706 is any storage configured to retrieve and store data. Some examples of the storage system 706 are flash drives, hard drives, optical drives, and/or magnetic tape. In some embodiments, the digital device 700 includes a memory system 704 in the form of RAM and a storage system 706 in the form of flash data. Both the memory system 704 and the storage system 706 comprise computer readable media which may store instructions or programs that are executable by a computer processor including the processor 702. The storage system 706 may comprise non-transitory media. One skilled in the art will recognize that, although the storage system 706 and memory system 704 are illustrated as different units, the storage system 706 and memory 704 can be parts of the same unit, distributed units, virtual memory, etc.

The communications network interface (com. network interface) 708 can be coupled to a network via the link 716. The communication network interface 708 may support communication over an Ethernet connection, a serial connection, a parallel connection, or an ATA connection, for example. The communication network interface 708 may also support wireless communication (e.g., 802.11 a/b/g/n, WiMax). It will be apparent to those skilled in the art that the communication network interface 708 can support many wired and wireless standards.

The input/output (I/O) interface 710 is any device that receives input from the user and/or outputs data. The display interface 712 is any device that is configured to output graphics and data to a display. In one example, the display interface 712 is a graphics adapter.

It will be appreciated by those skilled in the art that the hardware elements of the digital device 700 are not limited to those depicted in FIG. 7. A digital device 700 may comprise more or less hardware elements than those depicted. Further, hardware elements may share functionality and still be within various embodiments described herein. In one example, encoding and/or decoding may be performed by the processor 702 and/or a co-processor located on a GPU (e.g., an Nvidia® co-processor).

One skilled in the art will recognize that the digital device 700 may also include additional information, such as network connections, additional memory, additional processors, LANs, input/output lines for transferring information across a hardware channel, access to the Internet or an intranet, etc. One skilled in the art will also recognize that the programs and data may be received by and stored in the system in alternative ways. For example, a computer-readable storage medium (CRSM) reader such as a magnetic disk drive, hard disk drive, Flash drive, CPU, etc. may be coupled to the bus 714 for reading a computer-readable storage medium (CRSM) such as a magnetic disk, a hard disk, a magneto-optical disk, RAM, etc. Accordingly, the digital device 700 may receive programs and/or data via the CRSM reader. Further, it will be appreciated that the term "memory" herein is intended to cover all data storage media whether permanent or temporary.

The use of the terms "a", "an" and "the" and similar articles are to be construed as covering both the singular and the plural, unless otherwise indicated herein or contradicted by context. The terms "having", "including", "containing" and similar terms listing elements are to be construed as open-ended (e.g., "including but not limited to") unless otherwise noted. Recitation of ranges of values are intended to serve as a shorthand of referring individually to each separate value, whole or fraction, within the range, unless otherwise indicated herein. All methods described herein can be performed in any order unless otherwise indicated herein or contradicted by context. The use of any and all examples is intended to better illuminate embodiments of the invention and not to limit the scope of the patent to the particular example.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting.

The present invention is limited only by the following claims:

1. A testing system for testing performance conditions of a live multi-tenant system, the testing system comprising:
    at least one processor;
    memory storing program code for testing performance conditions of a live multi-tenant system that is hosting shared services for multiple tenants, the program code including:
        a scheduler configured to generate multiple start commands for starting multiple tests of the live multi-tenant system on behalf of the multiple tenants, each start command of the multiple start commands configured to start a respective test of the multiple tests on behalf of one of the multiple tenants;
        a controller configured to receive multiple controller commands associated with the multiple start commands, each of the multiple controller commands configured to cause the controller to login as a synthetic tenant user of the one of the multiple tenants and to cause one or more synthetic transaction inputs to be provided to the live multi-tenant system on behalf of the one of the multiple tenants, the live multi-tenant system configured to login the synthetic tenant user of the one of the multiple tenants and in response to the one or more synthetic transaction inputs perform one or more synthetic transactions involving at least one of multiple communication paths and/or destinations in the live multi-tenant system, the multiple controller commands including a first controller command configured to login as a first synthetic tenant user and to cause one or more first synthetic transaction inputs to be provided to the live multi-tenant system on behalf of a first tenant, the multiple controller commands including a second controller command configured to login as a second synthetic tenant user and to cause one or more second synthetic transaction inputs to be provided to the live multi-tenant system on behalf of a second tenant, the first synthetic user being dedicated to the first tenant, the second synthetic user being dedicated to the second tenant, the first synthetic user and the second synthetic user being different; and
        an automated test driver configured to receive the multiple start commands from the scheduler, to execute multiple test scripts for generating the multiple controller commands in response to the multiple start commands, to provide the multiple controller commands to the controller, to obtain multiple test results generated by the live multi-tenant system in response to the multiple synthetic transactions, and to generate and store one or more health indicators of the live multi-tenant system based on the multiple test results.

2. The testing system of claim 1, wherein each destination is a logical data store.

3. The testing system of claim 1, wherein the automated test driver is further configured to evaluate the multiple test results to determine the performance conditions of the live multi-tenant system on behalf of the multiple tenants, and to generate one or more alerts upon recognizing an alert trigger condition based upon the evaluating of the multiple test results.

4. The testing system of claim 1, wherein the scheduler generates the multiple start commands periodically.

5. The testing system of claim 1, wherein
    the live multi-tenant system includes user interfaces and servers,
    the live multi-tenant system is further configured to load balance tenant transactions through the user interfaces and the servers to the destinations, and
    each synthetic transaction uses a particular communication path through one of the user interfaces and one of the servers based on the load balancing in the live multi-tenant system to reach a particular destination.

6. The testing system of claim 1, wherein
    the live multi-tenant system includes user interfaces and servers,
    the live multi-tenant system is further configured to load balance tenant transactions through the user interfaces and the servers to the destinations, and
    each synthetic transaction uses a particular communication path through a particular one of the user interfaces and a particular one of the servers to reach a particular destination.

7. The testing system of claim 1, wherein the evaluating the multiple test results includes comparing the multiple test results against timing information.

8. The testing system of claim 1, wherein the evaluating the multiple test results includes comparing the multiple test results against expected test results.

9. The testing system of claim 1, wherein the evaluating the multiple test results includes evaluating handoff information between components of the live multi-tenant system.

10. The testing system of claim 1, wherein the multiple test scripts are configured instances of a default test script.

11. A method of testing performance conditions of a live multi-tenant system that is hosting shared services for multiple tenants, the method comprising:
    receiving multiple start commands for starting multiple tests of a live multi-tenant system on behalf of multiple tenants, the live multi-tenant system hosting shared services for the multiple tenants, each start command of the multiple start commands configured to start a respective test of the multiple tests on behalf of one of the multiple tenants;
    executing multiple test scripts for generating multiple controller commands in response to the multiple start commands, the executing the multiple test scripts causing one or more synthetic transaction inputs to be provided to the live multi-tenant system on behalf of the one of the multiple tenants, the live multi-tenant system configured to, in response to the one or more synthetic transaction inputs, perform one or more synthetic transactions involving at least one of multiple communication paths and/or destinations in the live multi-tenant system, the multiple controller commands including a first controller command configured to login as a first synthetic tenant user and to cause one or more first synthetic transaction inputs to be provided to the live multi-tenant system on behalf of a first tenant, the multiple controller commands including a second controller command configured to login as a second synthetic tenant user and to cause one or more second synthetic transaction inputs to be provided to the live multi-tenant system on behalf of a second tenant, the first synthetic user being dedicated to the first tenant, the second synthetic user being dedicated to the second tenant, the first synthetic user and the second synthetic user being different;
    obtaining multiple test results generated by the live multi-tenant system in response to the multiple synthetic transactions; and generating and storing one or more health indicators of the live multi-tenant system based on the multiple test results.

12. The method of claim 11, wherein each destination is a logical data store.

13. The method of claim 11, further comprising evaluating the multiple test results to determine the performance conditions of the live multi-tenant system on behalf of the multiple tenants, and generating one or more alerts upon recognizing an alert trigger condition based upon the evaluating of the multiple test results.

14. The method of claim 11, wherein the generating the multiple start commands includes generating the multiple start commands periodically.

15. The method of claim 11, wherein
the live multi-tenant system includes user interfaces and servers,
the live multi-tenant system is further configured to load balance tenant transactions through the user interfaces and the servers to the destinations, and
each synthetic transaction uses a particular communication path through one of the user interfaces and one of the servers based on the load balancing in the live multi-tenant system to reach a particular destination.

16. The method of claim 11, wherein
the live multi-tenant system includes user interfaces and servers,
the live multi-tenant system is further configured to load balance tenant transactions through the user interfaces and the servers to the destinations, and
each synthetic transaction uses a particular communication path through a particular one of the user interfaces and a particular one of the servers to reach a particular destination.

17. The method of claim 11, wherein the evaluating the multiple test results includes comparing the multiple test results against timing information.

18. The method of claim 11, wherein the evaluating the multiple test results includes comparing the multiple test results against expected test results.

19. The method of claim 11, wherein the evaluating the multiple test results includes evaluating handoff information between components of the live multi-tenant system.

20. The method of claim 11, wherein the multiple test scripts are configured instances of a default test script.

21. A non-transitory computer-readable storage medium storing program code for causing a processor to perform the steps of:
receiving multiple start commands for starting multiple tests of a live multi-tenant system on behalf of multiple tenants, the live multi-tenant system hosting shared services for the multiple tenants, each start command of the multiple start commands configured to start a respective test of the multiple tests on behalf of one of the multiple tenants;
executing multiple test scripts for generating multiple controller commands in response to the multiple start commands, the executing the multiple test scripts causing one or more synthetic transaction inputs to be provided to the live multi-tenant system on behalf of the one of the multiple tenants, the live multi-tenant system configured to, in response to the one or more synthetic transaction inputs, perform one or more synthetic transactions involving at least one of multiple communication paths and/or destinations in the live multi-tenant system, the multiple controller commands including a first controller command configured to login as a first synthetic tenant user and to cause one or more first synthetic transaction inputs to be provided to the live multi-tenant system on behalf of a first tenant, the multiple controller commands including a second controller command configured to login as a second synthetic tenant user and to cause one or more second synthetic transaction inputs to be provided to the live multi-tenant system on behalf of a second tenant, the first synthetic user being dedicated to the first tenant, the second synthetic user being dedicated to the second tenant, the first synthetic user and the second synthetic user being different;
obtaining multiple test results generated by the live multi-tenant system in response to the multiple synthetic transactions; and
generating and storing one or more health indicators of the live multi-tenant system based on the multiple test results.

* * * * *